US011935435B1

(12) United States Patent
Allen

(10) Patent No.: US 11,935,435 B1
(45) Date of Patent: Mar. 19, 2024

(54) REAR VEHICLE ADVERTISEMENT DISPLAY SYSTEM

(71) Applicant: Robert Allen, Holladay, UT (US)

(72) Inventor: Robert Allen, Holladay, UT (US)

( * ) Notice: Subject to any disclaimer, the term of this patent is extended or adjusted under 35 U.S.C. 154(b) by 0 days.

(21) Appl. No.: 17/547,808

(22) Filed: Dec. 10, 2021

Related U.S. Application Data

(60) Provisional application No. 63/137,032, filed on Jan. 13, 2021.

(51) Int. Cl.
*G09F 21/04* (2006.01)
*G09F 17/00* (2006.01)

(52) U.S. Cl.
CPC ............ *G09F 21/048* (2013.01); *G09F 17/00* (2013.01); *G09F 2017/005* (2013.01); *G09F 2017/0075* (2013.01)

(58) Field of Classification Search
CPC .. G09F 21/048; G09F 17/00; G09F 2017/005; G09F 2017/0075; G09F 11/18; G09F 11/29; G09F 15/0025; G09F 15/0062; G09F 11/08; G09F 11/30; G09F 11/21; G09F 2017/0025; G09F 2017/0041; G09F 17/0091
USPC ................. 40/591–593, 514, 517; 116/28 R, 116/173–175, 209
See application file for complete search history.

(56) References Cited

U.S. PATENT DOCUMENTS 2,561,188 A * 7/1951 Ferguson .............. B60J 11/025 160/DIG. 3
4,953,315 A 9/1990 Romaine
5,463,973 A 11/1995 Tait
5,715,620 A 2/1998 Walker
5,860,466 A * 1/1999 Kao ...................... B60J 1/2088 160/370.22
5,933,991 A 8/1999 Gaul
6,922,929 B1 8/2005 Schramek
7,154,383 B2 12/2006 Berquist
7,316,087 B1 1/2008 Smith
8,104,820 B2 1/2012 Browne et al.
8,383,213 B1 2/2013 Clarke
8,701,320 B2 4/2014 Gold et al.
9,260,056 B2 2/2016 Strout et al.
(Continued)

FOREIGN PATENT DOCUMENTS

CN 109466285 B * 9/2021 ........... B60J 1/2088
DE 102013013857 2/2014
(Continued)

OTHER PUBLICATIONS

English Translation of Foreign Patent KR-200481999-Y1 to Kim (Year: 2015).*

*Primary Examiner* — Cassandra Davis
(74) *Attorney, Agent, or Firm* — John Rizvi; John Rizvi, P.A—The Patent Professor®

(57) ABSTRACT

The present invention is directed to a rear vehicle advertisement display that allows for messaging in the form of text and/or graphics to be displayed on the rear of a vehicle when a. rear windshield wiper is in use. The advertisement display system includes a base frame, a hollow vessel, a flexible panel stored within the hollow vessel, and a mounting member for attaching the system to a vehicle. The advertisement display system disclosed is dynamic, such that the advertisement is visible in certain scenarios and hidden in others.

16 Claims, 4 Drawing Sheets

(56) References Cited

U.S. PATENT DOCUMENTS

| | | | | |
|---|---|---|---|---|
| 2008/0005942 | A1* | 1/2008 | Harney | G09F 11/21 40/518 |
| 2008/0169664 | A1 | 7/2008 | Dampier et al. | |
| 2009/0272832 | A1* | 11/2009 | Gantzer | B65H 75/28 242/379.2 |
| 2010/0055661 | A1* | 3/2010 | Hegwood | A47B 97/02 434/420 |
| 2010/0065232 | A1* | 3/2010 | Browne | B60J 11/025 15/250.31 |
| 2010/0263245 | A1* | 10/2010 | Bowser | G09F 17/00 40/517 |
| 2013/0333142 | A1 | 12/2013 | Shenk | |
| 2014/0047744 | A1 | 2/2014 | Bates, II | |

FOREIGN PATENT DOCUMENTS

| | | | | |
|---|---|---|---|---|
| DE | 202017004276 | | 1/2018 | |
| FR | 2526569 | A * | 11/1983 | G09F 11/29 |
| GB | 2500369 | | 9/2013 | |
| KR | 200481999 | Y1 * | 7/2015 | B60Q 7/00 |
| WO | WO2012027621 | | 3/2012 | |
| WO | WO2014125196 | A | 8/2014 | |

* cited by examiner

REAR VEHICLE ADVERTISEMENT DISPLAY SYSTEM

CROSS-REFERENCE TO RELATED APPLICATIONS

This application claims the benefit of U.S. Provisional Patent Application No. 63/137,032, filed on Jan. 13, 2021, which is incorporated by reference herein in its entirety.

FIELD OF THE INVENTION

The present invention relates generally to an advertisement display system. More particularly, the present invention relates to a rear vehicle advertisement display system that is designed and configured to be mountable to the rear windshield wipers of a vehicle. The rear vehicle advertisement display is intended to display an advertisement, usually in the form of texts or graphics, or both, as the windshield wiper moves from one side of the windshield to the other.

BACKGROUND OF THE INVENTION

The purpose of displaying a physical form media on automotive vehicles varies widely. Some common uses for displaying a physical form of media may be: delivering a commercial message or impression, asserting a personal belief or perspective, supporting and promoting an organization, school or political candidate, or simply for personal pleasure, In general, the intent of placing physical form media on an automotive vehicle is to capture the attention of other drivers and onlookers so that the text or graphic displayed delivers the intended message. For example, signs places on taxis, busses, and other forms of public transportation and typically for this purpose.

Positioning of the physical form media on an automotive vehicle may depend on the intended audience, such as pedestrians or other motorists. The desired period of observation may also be a factor in selecting both the placement and type of physical form of media used. Effectiveness of physical form media in commanding attention of observers and delivering the intended message often varies with the type of physical form media employed and its placement on the vehicle, as well as message content and format.

Magnetic signs, vehicle graphics, and decals do not provide the means for dynamic image displays on automotive vehicles. Temporary displays typically used on top of privately owned vehicles employed for pizza delivery are often not dynamic. Mounting a digital display on top of a vehicle is generally not at the eye level of an observer in a following vehicle and may require a physically larger device and message to assure capturing their attention and delivering the intended message. In addition, this type of display on top of a vehicle may be subject to high wind pressure during motion of the vehicle, requiring stronger attachment points than if less wind pressure were present, which can increase cost. Additionally, many users may not desire a complex system and would rather a simpler system which can be easily modulated between an on and off position such that the system itself is not unduly noticeable during an off state.

Accordingly, there remains a need in the art for a solution to at least one of the aforementioned problems. For instance, a rear vehicle advertisement display system is desired. Additionally, it is desired that the advertisement display be at eye level and allow a user to modulate its use between and on and off configuration. Preferably, it is also desired that when the system is placed in an off state the vehicle is still able to maintain a strong aesthetic quality.

SUMMARY OF THE INVENTION

The present invention is directed to a rear vehicle advertisement display that allows for messaging in the form of text and/or graphics to be displayed on the rear of a vehicle when a rear windshield wiper is in use. The advertisement display system includes a base frame, a hollow vessel, a flexible panel stored within the hollow vessel, and a mounting member for attaching the system to a vehicle. The advertisement display system may further include at least one opening within the hollow vessel for storing the flexible panel or allowing the flexible panel to retract out of the vessel. The flexible panel may contain ornamental or decorative elements, such as text or graphics or a combination of both, to provide the type of messaging or advertising by the user. A method for using the advertisement display system is also provided.

The advertisement display system may solve a. number of problems currently associated with traditional advertisement found on vehicles. Firstly; the advertisement display system disclosed is dynamic, such that the advertisement is visible in certain scenarios and hidden in others. This allows a user to display the advertising when they so desire, but also allows them to, in effect, 'turn off' the advertising when desired as well. The dynamic effect of the display may also garner more attention and may be more noticeable on the road than stationary advertisements on vehicles. Secondly, the advertisement display system allows users to display advertisements as desired at a relatively inexpensive cost relative to other types of vehicle advertising. Lastly, the advertisement display system is able to maintain the positive aesthetic quality of a vehicle by allowing a user to keep the advertisement hidden when the rear windshield wiper is not in use.

In a first implementation of the invention, a rear vehicle advertisement display system comprises:

- a base frame;
- a hollow vessel, the hollow vessel having at least one opening and being affixed to a portion of the base frame;
- a flexible panel; and
- a mounting member, the mounting member being configured to mount to a rear portion of a vehicle and to attach to a portion of the flexible panel; wherein
- the rear vehicle advertisement display system is configured to adopt:
- a first configuration; in which the flexible panel is stored within the hollow vessel through the opening, and
- a second configuration, in which the flexible panel is extended from the hollow vessel and a front surface of the flexible panel is visible, and further wherein
- in both the first configuration and the second configuration, the hollow vessel is anchored to the vehicle by the base frame.

In a second aspect, the base frame may include a pair of sloped arms and along with the hollow vessel form a triangular shape.

In another aspect, the pair of sloped arms of the base frame may form an apex,

In another aspect, the apex of the base frame may be attached to a rear windshield wiper of the vehicle.

In another aspect, the hollow vessel may include a proximal end containing the opening.

In another aspect, the proximal end of the hollow vessel may mate to a proximal end of the base frame, In another aspect, the opening may be sized and configured to fit the flexible panel.

In another aspect, the hollow vessel may include a second opening designed and configured to serve as an inlet and outlet for the flexible panel.

In another aspect, the hollow vessel may include a distal end which mates to a distal end of the frame.

In another aspect, the hollow vessel may be rigid.

In another aspect, the hollow vessel may have a cylindrical shape.

In another aspect, the flexible panel may be a roll-up screen.

In another aspect, the flexible panel may be wound around a spool.

In another aspect, the flexible panel may include text, graphics, or other ornamental designs.

In another aspect, the mounting member may include a top flange and a bottom flange.

In another aspect, the top flange and the bottom flange of the mounting member may be connected by a cylindrical rod.

In another aspect, the cylindrical rod may have a cross-sectional diameter than less than the top portion and the bottom the portion of the mounting member.

In another aspect, the first configuration may be the default position for the rear vehicle advertisement display system.

In another aspect, the second configuration may occur when the rear windshield wiper is in use:

In another aspect, the flexible panel may be weatherproof

In another implementation of the invention, a method of installing and operating the rear vehicle advertisement display system comprises:

- obtaining a rear vehicle advertisement display system, the rear vehicle advertisement display system having a base frame affixed to a hollow vessel, the hollow vessel having at least one opening, a flexible panel, and a mounting member configured to attach to the flexible panel;
- placing the flexible panel in the hollow vessel through the at least one opening;
- attaching a portion of the base frame to a portion of a rear windshield wiper blade of a vehicle;
- mounting the mounting member to a rear portion of the vehicle;
- pulling out the flexible panel through a second opening on the hollow vessel and affixed an end portion of the flexible panel to the mounting; and
- running the rear windshield wiper such that a Hi front surface of the flexible panel is visible.

In another aspect; the second opening may be a vertical groove.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. Furthermore, there is no intention to be bound by any expressed or implied theory presented in the preceding technical field, background, brief summary or the following detailed description, ft is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a rear vehicle advertisement display system that is designed and configured to display an advertisement, message, text, and/or graphics on the rear of a vehicle. In particular, the advertisement, message, text, and/or graphics may be visible when a rear windshield wiper of the vehicle is in use and may be hidden when the rear windshield wiper of the vehicle is not in use, The rear vehicle advertisement display system may include a base frame, a hollow vessel, a flexible panel, and a mounting member configured to mount the system to the rear of the vehicle.

Figure 1:
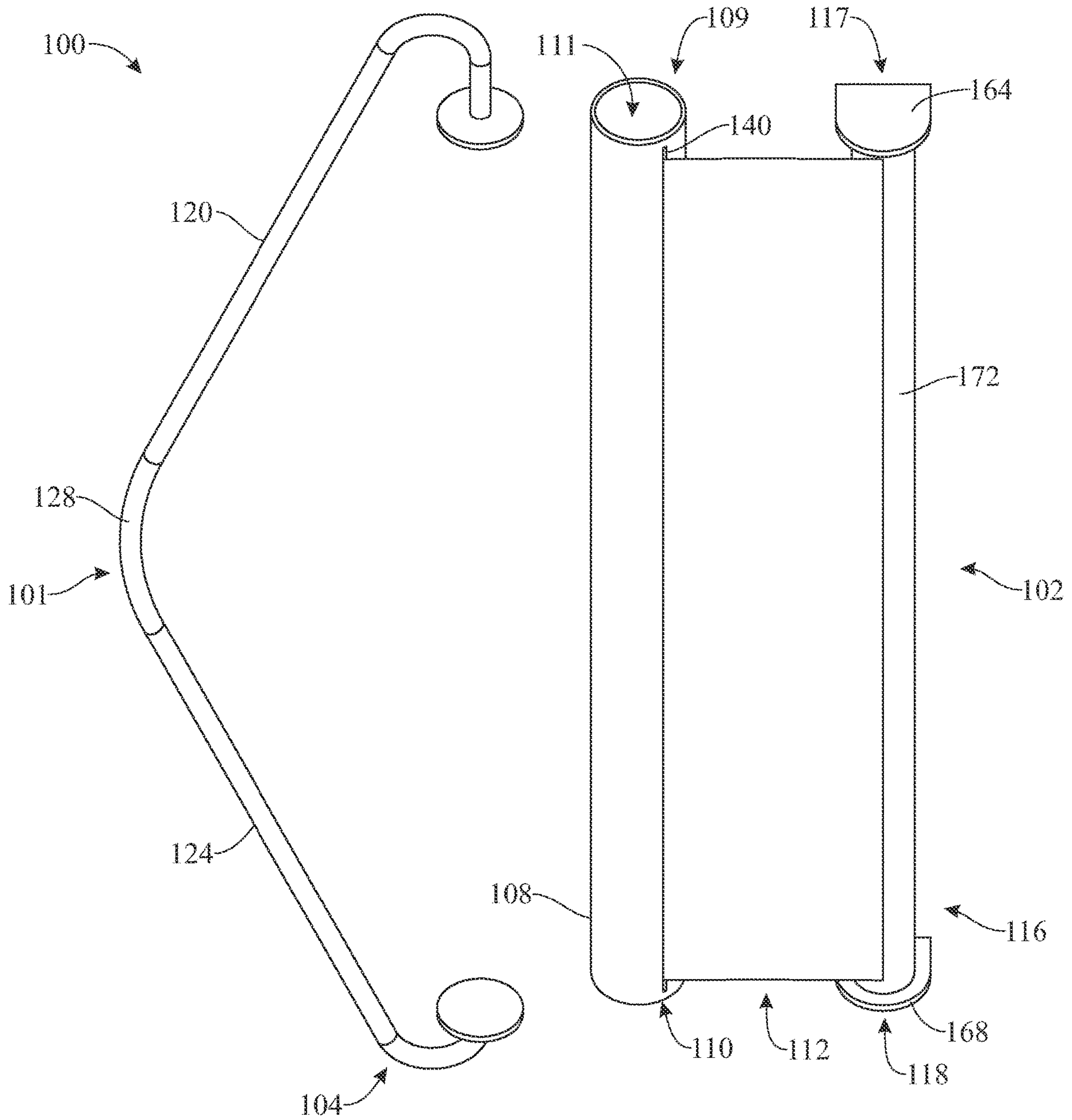
FIG. 1 presents a front perspective view of the rear vehicle advertisement display, system in accordance with a first illustrative embodiment of the invention.

Referring initially to FIG. 1, a rear vehicle advertisement display system 100 is illustrated in accordance with an exemplary embodiment of the present invention. As shown, the advertisement display system 100 includes a proximal end 101 and a distal end 102. The advertisement display system 100 may also include a base frame 104 that is connected to a hollow vessel 108. As will be described in greater detail hereinafter, the hollow vessel 108 may be designed and configured to store and extend a flexible panel 112 as desired. Additionally, the flexible panel may attach to a mounting member 116. The mounting member 116 may be configured to attach the advertisement display system 100 to a rear portion of a vehicle.

Figure 3:
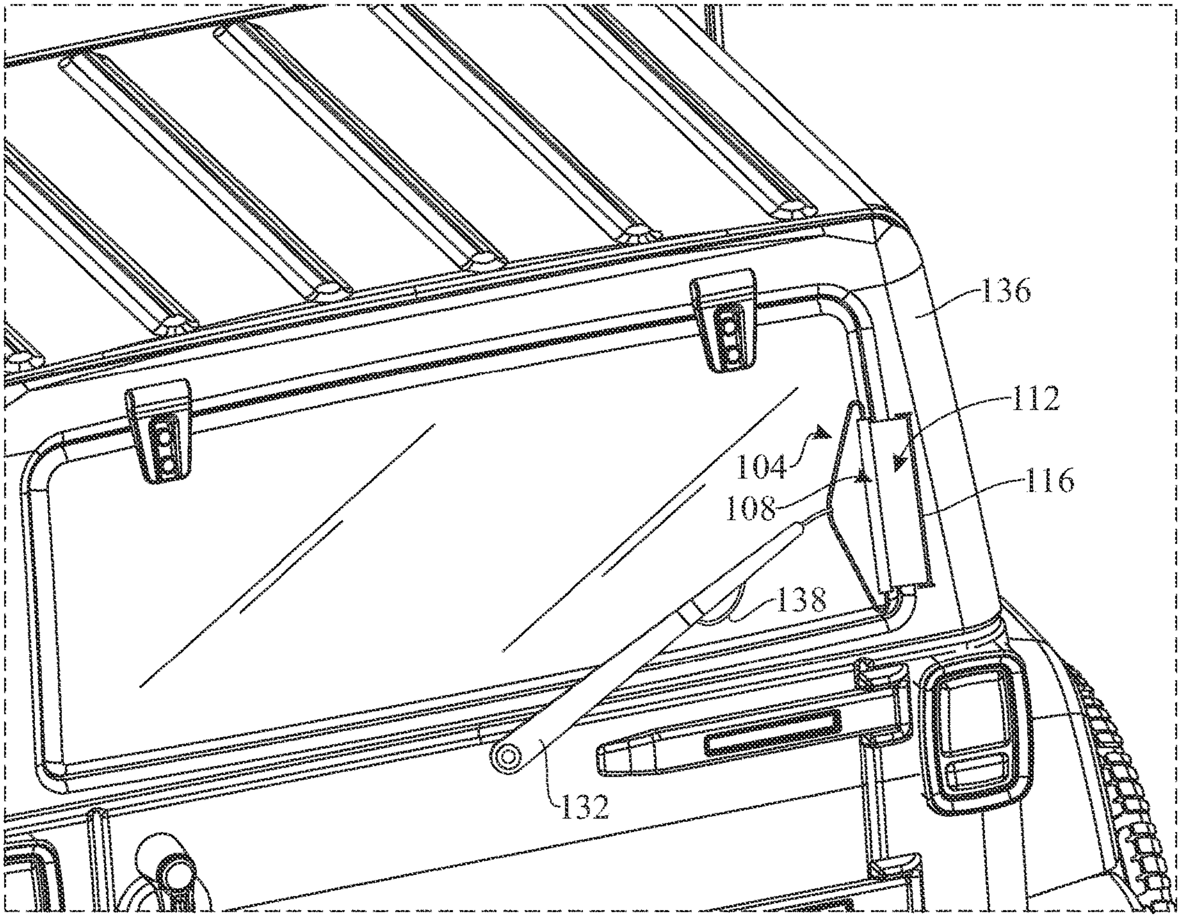
FIG. 3 presents a front perspective view of the rear vehicle advertisement display system illustrated in FIG. 1, affixed to the rear of a vehicle.

With continued reference to FIG. 1, the base frame 104 may include a first arm 120 and a second arm 124, defining a pair of sloped arms 120, 124 adjoined to each other forming an apex 128. The pair of sloped arms 120, 124 may be made of a rigid material such as a metal or metal alloy. Additionally, the pair of sloped arms 120, 124 may be rods or similar cylindrical structures. The apex 128 of the base frame 104 may represent the proximal end 101 of the advertisement display system 100 and may attach to a rear windshield wiper 132 of a vehicle 136, as best shown in FIG. 3. The attachment of the base frame 104 to the rear windshield wiper 132 may occur by wire 138. Alternatively, other embodiments are contemplated in which the base frame 104 may attach to the rear windshield wiper 132 through other fastening mechanisms. Referring back to FIG. 1, connected to each of the pair of sloped arms 120, 124 may be the aforementioned hollow vessel 108. The pair of sloped arms 120, 124 along with the hollow vessel 108 may define a generally triangular shape for the base frame 104.

Figure 2:
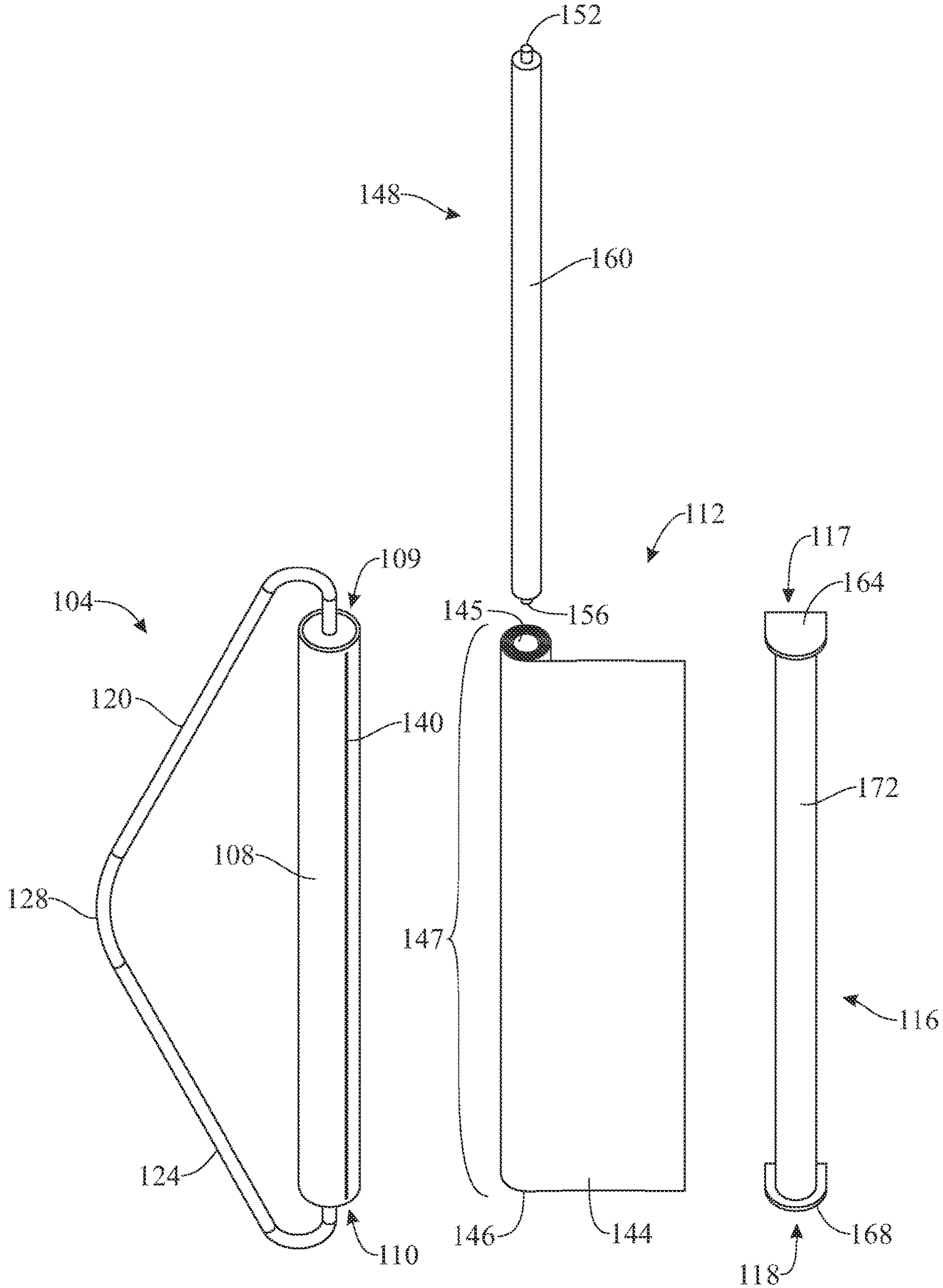
FIG. 2 presents an exploded; front perspective view of the rear vehicle advertisement display system illustrated in FIG. 1.

Referring now to FIG. 2., the hollow vessel 108 may be shown having a proximal end 109 and a distal end 110. The proximal end 109 of the hollow vessel may attach to the first sloped arm 120. Similarly, the distal end 110 of the hollow vessel 108 may attach to the second sloped arm 124 forming the aforementioned triangular shape of the base frame 104. At the proximal end 109 of the hollow vessel 108 may be a first opening (not shown). The first opening may be sized and configured to input the flexible panel 112 into the hollow vessel 108. Alternatively or additionally, the first opening may also be at the distal end 110 of the hollow vessel. The hollow vessel 108 may also include a second opening 140 which runs the length of the hollow vessel 108 from the proximal end 109 to the distal end 110. The second opening 140 may be configured to allow the flexible panel to extend out of the hollow vessel 108, as shown in FIG. 1. Referring back to FIG. 2, the hollow vessel 108 may be rigid. The hollow vessel 108 may be comprised of a metal or metal allow. Alternatively, the hollow vessel 108 may be comprised of a plastic or other sturdy material. Preferably, the hollow vessel 108 is also comprised of an unabsorbent material such that water may not enter the hollow vessel 108. The hollow vessel 108 have a cylindrical shape. Alternatively, embodiments are envisioned in which the hollow vessel 108 may be any shape which can adequately accommodate a flexible panel 112. The second opening 140 may be represented as a slit in the body of the hollow vessel 108. Preferably, the second opening 140 has a thickness slightly greater than the thickness of the flexible panel 112, such that the flexible panel 112 may extend out through the second opening 140.

Figure 5:
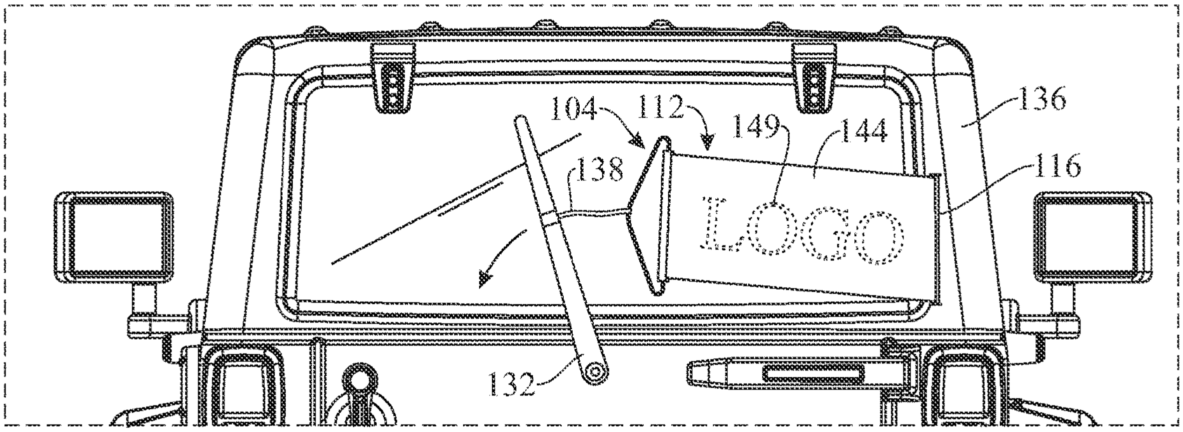
FIG. 5 presents a front view of the rear vehicle advertisement display system illustrated in FIG. 1, affixed to the rear of a vehicle and in use such that the rear windshield wiper is on and the full front surface of the flexible panel is displayed.

With continued reference to FIG. 2, in some embodiments, such as the present embodiment the flexible panel 112 may be a roll-up screen 144. The roll-up screen 144 may include a top portion 145 and a bottom portion 146. The top portion 145 and bottom portion 146 may define a vertical height 147 of the roll-up screen 144. Alternatively, in other embodiments, it is contemplated that the flexible panel 112 may be entirely or partially made of mesh-type material. It is also contemplated that the flexible panel 112 may be partially or entirely made of a plastic, fabric, metal, or other material. The flexible panel 112 may also be entirely or partially transparent, translucent, or opaque. In the present embodiment, the roll-up screen 144 may be opaque and may allow for advertisements or messaging in form of text and/or graphics 148 or other compositions to be present on the roll-up screen 144, as best shown in FIG. 5.

Referring back to FIG. 2, the roll-up screen 144 of the flexible panel 112 may be wound about a spool 148. The spool 148 may include a top flange 152 and a bottom flange 156. Connected to the top flange 152 and bottom flange 156 may be a cylindrical rod 160. The cylindrical rod 160 may be designed and configured to allow the roll-up screen 144 to remain spun in place about the spool 148, without falling past either flange 152, 156. As will be described in greater detail hereinafter, the roll-up screen 144 may also be configured to attach to a portion of the mounting member 112 at the distal end 102 of the advertisement display system, as best shown in FIG. 1. Additionally, the spool 148 may also be designed and configured to allow the roll-up screen 144 to retract and be spun around the cylindrical rod 160 when the flexible panel 112 is not engaged to the mounting member 116.

Referring back to FIG. 1, the mounting member 116 is shown having a proximal end 117 and a distal end 118. The mounting member 116 may include top flange 164 at the proximal end 117 and a bottom flange 168 at the distal end 118. A cylindrical post 172 may connect the top flange 164 to the bottom flange 168. Preferably, the cross-sectional diameter of the cylindrical post 172 is less than the diameter of the top flange 164 and the bottom flange 168, Alternatively, the diameter of the top flange 164 and bottom flange 168 may be the same as the cross-sectional diameter of the cylindrical post 172. Each of the top flange 164, bottom flange 168, and cylindrical post 174 may be comprised of sturdy, rigid materials such as metal, metal alloys, and high-density plastics. Additionally, the mounting member 116 has a tab or other fastening mechanism on the cylindrical post 172 that is designed and configured to mate with an edge of the flexible panel 112.

The illustrations of FIGS. 1-5 demonstrate an example method of operation and installation of the rear vehicle advertisement display system 100. Referring initially to FIG. 1, installation of the advertisement display system 100 may begin by configuring the flexible panel 112. The flexible panel 112 may be initially be configured by placing the roll-up screen 144 on the spool 148, as best shown in FIG. 2. The roll-up screen 144 may fit in the flexible panel 112 on the cylindrical post 172 in between the top flange 164 and the bottom flange 168. Upon situating the roll-up screen 144 on the spool 148, the spool 148 may be placed within hollow vessel 108 at an opening either on the proximal end 109 or the distal end 110. The hollow vessel 108 may then be connected to the base frame 104. The proximal end 109 of the hollow vessel 108 may connect to an end of the first sloped arm 120. The distal end 110 of the hollow vessel 108 may connect to an end of the second sloped arm 124. The base frame 104, defined by the pair of sloped arms 120, 124 in conjunction with the hollow vessel 108 may exhibit the triangular shape as previously mentioned.

Referring now to FIG. 3, upon attachment of the hollow vessel 108 to the base frame 104, the base frame may be affixed to the rear of the vehicle 136. Specifically, the base frame 104 may be attached to the rear windshield wiper 132. At the apex 128 of the base frame 104, the wire 138 may be tied or attached by some attachment means. Upon this attachment, the wire 138 may then be attached to the rear windshield wiper 132 by either tying the wire 138 to the windshield wiper 132 or using some other attachment means. The wire 138 may be attached at the center of the windshield wiper 132. Alternatively, the wire 138 may be attached at the end of the windshield wiper 132.

Upon affixing the base frame 104 to the rear of the vehicle 136, the mounting member 116 may then be mounted to the rear of the vehicle 136 as well. Because the mounting member 116 generally represents the distal end 102 of the advertisement display system 100, it may be mounted to the vehicle 136 at some point right of the base frame 104. The distance between the base frame 104 and the mounting member 116 may vary based on the size of the flexible panel 100. The mounting member 116 may be mounted by a fastening mechanism (not shown) found on the cylindrical post 172, as shown in FIG. 2. Alternatively, the mounting member 116 may be mounted to the vehicle 136 through other fastening means, such as applying an adhesive to the cylindrical post 172.

Figure 4:
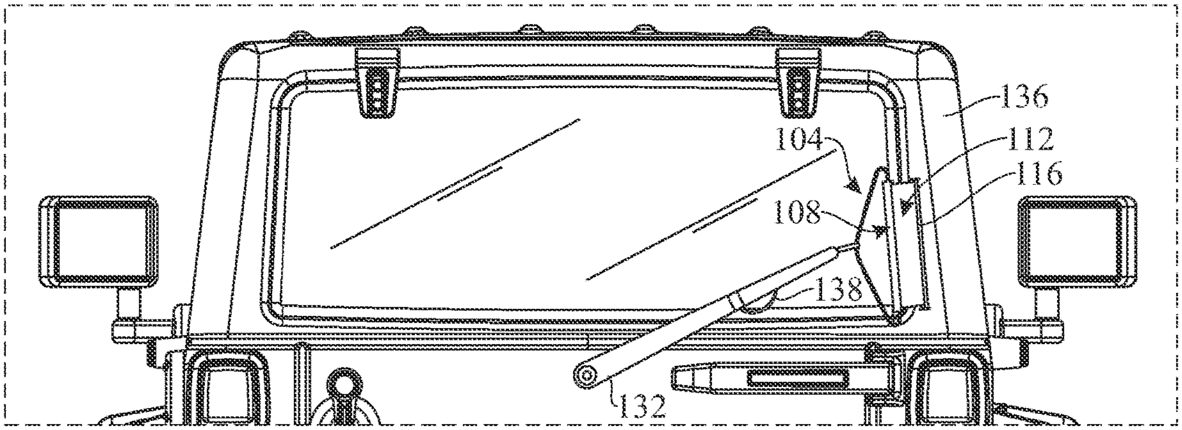
FIG. 4 presents a front view of the rear vehicle advertisement display system illustrated in FIG. 1, affixed to the rear of a vehicle.

Upon affixing both the base frame 104 and the mounting member 116 to the rear of the vehicle 136, the advertisement display system 100 may be placed in a first configuration. The first configuration may be achieved by extending the roll-up screen 144 out of the hollow vessel 108 and latching it onto a portion of the cylindrical post 172 of the mounting member 116, as best shown in FIG. 3 and FIG. 4. This may be the configuration the advertisement display system 100 may be in when the rear windshield wiper 132 is either off or oscillates back—to its original position. A second configuration of the advertisement display system 100 may be achieved when the windshield wiper 132 oscillates to a secondary position some intermediate distance. In this second configuration, the roll-up screen 144 of the flexible barrier 116 may extend out of the hollow vessel 108 and reveal the aforementioned message, text, or graphics 148, as best shown in FIG. 5, When the windshield wiper 132 is in use, the advertisement display system may oscillate between the first configuration and the second configuration.

Alternative embodiments are contemplated to those shown or described herein without departing from the scope of the present disclosure. For example, embodiments are contemplated in which the material of flexible panels vary. Another alternative embodiment considered is the attachment mechanism found of the mounting member. For instance, some embodiments are envisioned in which the snap in or get screwed into a rear portion of the vehicle. In other embodiments, in may be envisioned that an adhesive may be applied to act as the fastening mechanism. Lastly, it is contemplated that the how the advertisement display system integrates with the vehicle may vary. For instance, a system is envisioned which may not utilize the rear windshield wiper.

In summary, the rear vehicle advertisement disclosed herein provides a system that creates a dynamic display on the exterior of a vehicle. The dynamic display is shown at eye level for other drivers such that the desired text, graphic, or other images that make up the advertisement are visible without being distracting. The flexible panels can easily be configured to adopt a first configuration wherein they are simply stored within the hollow vessel or a second configuration in which the panels are extended.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A rear vehicle advertisement display system comprising:

A singular base frame configured to attach to a rear windshield wiper of a vehicle;

a hollow vessel, the hollow vessel having at least one opening including opposing ends, the opposing ends mating with the base frame;

a flexible panel; and a mounting member, the mounting member being configured to mount to a rear portion of a vehicle and to attach to a portion of the flexible panel; wherein the rear vehicle advertisement display system is configured to adopt:

a first configuration, in which the flexible panel is stored within the hollow vessel through the opening, and a second configuration, in which the flexible panel is configured to extend extended from the hollow vessel when the rear windshield wiper oscillates from a first position to second position some distance away from the first position and a front surface of the flexible panel is visible, and further wherein in both the first configuration and the second configuration, the hollow vessel is adapted to be anchored to the vehicle by the base frame.

2. The advertisement display system of claim 1, wherein the base frame includes a pair of sloped arms, and further wherein the pair of sloped arms along with the hollow vessel form a triangular shape.

3. The advertisement display system of claim 2, wherein the pair of sloped arms of the base frame form an apex.

4. The advertisement display system of claim 1, wherein the hollow vessel includes a proximal end containing the at least one opening.

5. The advertisement display system of claim 4, wherein the proximal end of the hollow vessel mates to a proximal end of the base frame.

6. The advertisement display system of claim 1, wherein the at least one opening is sized and configured to fit the flexible panel.

7. The advertisement display system of claim 1, wherein the hollow vessel is rigid.

8. The advertisement display system of claim 1, wherein the hollow vessel conforms to a cylindrical shape.

9. The advertisement display system of claim 1, wherein the flexible panel may be a roll-up screen.

10. The advertisement display system of claim 9, wherein the roll-up screen is wound around a spool.

11. The advertisement display system of claim 1, wherein the flexible panel includes at least one of text, graphics, and other ornamental designs.

12. The advertisement display system of claim 1, wherein the mounting member includes a top flange and a bottom flange.

13. The advertisement display system of claim 12, wherein the top flange and the bottom flange of the mounting member are connected by a cylindrical rod.

14. The advertisement display system of claim 13, wherein the cylindrical rod has a cross-sectional diameter less than the cross-sectional diameter of a top portion and a bottom the portion of the mounting member.

15. A rear vehicle advertisement display system comprising:

a singular base frame having a pair of sloped arms forming an apex, the apex configured to attach to a rear windshield wiper of a vehicle;

a hollow vessel, the hollow vessel having at least one opening and including opposing ends, the opposing ends mating with the base frame, wherein the pair of sloped arms of the base frame along with the hollow vessel form a triangular shape;

a flexible panel; and a mounting member, the mounting member being configured to mount to a rear portion of a vehicle and to attach to a portion of the flexible panel; wherein the rear vehicle advertisement display system is configured to adopt:

a first configuration, in which the flexible panel is stored within the hollow vessel through the opening, and a second configuration, in which the flexible panel is configured to extend from the hollow vessel when the rear windshield wiper oscillates from a first position to second position some distance away from the first position and a front surface of the flexible panel is visible, and further wherein in both the first configuration and the second configuration, the hollow vessel is adapted to be anchored to the vehicle by the base frame.

16. A rear vehicle advertisement display system comprising:

a singular base frame having a pair of sloped arms forming an apex, the apex configured to attach to a rear windshield wiper of a vehicle;

a rigid, cylindrical hollow vessel, the hollow vessel having at least one opening and including opposing ends, the opposing ends mating with base frame, wherein the pair of sloped arms of the base frame along with the hollow vessel form a triangular shape;

a flexible panel, the flexible panel including at least one of text, graphics, and other ornamental designs; and a mounting member, the mounting member including a top flange and a bottom flange connected by a cylindrical rod and being configured to mount to a rear portion of a vehicle and to attach to a portion of the flexible panel; wherein the rear vehicle advertisement display system is configured to adopt:

a first configuration, in which the flexible panel is stored within the hollow vessel through the opening, and a second configuration, in which the flexible panel is configured to extend extended from the hollow vessel when the rear windshield wiper oscillates from a first position to second position some distance away from the first position and a front surface of the flexible panel is visible, and further wherein in both the first configuration and the second configuration, the hollow vessel is adapted to be anchored to the vehicle by the base frame.

* * * * *